United States Patent [19]
Kronberg

[11] Patent Number: 5,547,283
[45] Date of Patent: Aug. 20, 1996

[54] OPTICAL TEMPERATURE SENSOR USING THERMOCHROMIC SEMICONDUCTORS

[76] Inventor: James W. Kronberg, 108 Independent Blvd., Aiken, S.C. 29801

[21] Appl. No.: 332,068

[22] Filed: Nov. 1, 1994

[51] Int. Cl.[6] .......................... G01K 11/12; G01K 11/14; G01K 1/14
[52] U.S. Cl. .................. 374/162; 252/962; 252/408.1
[58] Field of Search ..................... 374/162; 116/216; 252/962, 408.1

[56] References Cited

U.S. PATENT DOCUMENTS

| | | | |
|---|---|---|---|
| 1,924,793 | 8/1933 | Laske | 106/287.18 |
| 3,348,917 | 10/1967 | Nestor | 116/207 |
| 3,352,794 | 11/1967 | Abdo | 374/162 |
| 3,561,269 | 2/1971 | Seitz | 374/162 |
| 3,781,523 | 12/1973 | Borom | 252/408.1 |
| 4,105,583 | 8/1978 | Glover et al. | 116/207 |
| 4,268,413 | 5/1981 | Dabisch | 116/216 |
| 4,278,349 | 7/1981 | Sander | 374/162 |
| 4,283,113 | 8/1981 | Eden | 365/5 |
| 4,424,990 | 1/1984 | White et al. | 116/207 |
| 5,008,136 | 4/1991 | Chamberlain | 374/161 |
| 5,165,797 | 11/1992 | Kuroda et al. | 374/162 |

FOREIGN PATENT DOCUMENTS

| | | | |
|---|---|---|---|
| 0116882 | 10/1978 | Japan | 374/162 |
| 0109828 | 6/1983 | Japan | 374/162 |

OTHER PUBLICATIONS

Day, Jesse H., "Thermochromism of Inorganic Compounds," Chemical Reviews, pp. 649–657 (Nov. 25, 1968).

Primary Examiner—Diego F. F. Gutierrez
Attorney, Agent, or Firm—Harold M. Dixon; William R. Moser; Paul A. Gottlieb

[57] ABSTRACT

An optical temperature measuring device utilizes thermochromic semiconductors which vary in color in response to changes in temperature. The thermochromic material is sealed in a glass matrix which allows the temperature sensor to detect high temperatures without breakdown. Cuprous oxide and cadmium sulfide are among the semiconductor materials which provide the best results. The changes in color may be detected visually or by utilizing an optical fiber and an electrical sensing circuit.

10 Claims, 5 Drawing Sheets

OPTICAL TEMPERATURE SENSOR USING THERMOCHROMIC SEMICONDUCTORS

BACKGROUND OF THE INVENTION

1. Field of the Invention

The present invention relates to an apparatus for measuring temperature over a wide range of values. In particular, a thermochromic semiconductor is utilized which changes its color or absorbance in response to temperature. The United States Government has rights in this invention pursuant to Contract No. DE-AC09-89SR18035 between the United States Department of Energy and Westinghouse Savannah River Company.

2. Discussion of Background

Optical thermometry is a growing technological field which exploits the ability of certain materials to change their optical properties with temperature. A subclass of such materials are those which change their color as a reversible and reproducible function of temperature. These materials are thermochromic.

One class of thermochromic materials are liquid crystals. Liquid crystals are synthetic chemical derivatives of cholesterol. Liquid crystals are intrinsically colorless, but the ordering causes a response like three-dimensional diffraction gratings. With rising temperature, the reflected wavelengths from the liquid crystals grow shorter. When placed before a dark backing, crystals appear successively black, brown, green, blue and finally black again. The temperature measurement range for thermometers based on liquid crystals is from around 0 to 60 degrees Celsius. At higher temperatures or after long periods of exposure to sunlight the liquid crystals break down permanently.

Another class of thermochromic temperature indicators utilize solid cupromercuric iodide which exists in two forms. The red form is stable below about 67 degrees Celsius while the second, brown form is stable above that temperature. Conversion from one form to the other is rapid and reversible. The transition temperature varies somewhat depending on the type and amount of impurities in the iodide. Paints or labels containing cupromercuric iodide are sometimes used as reversible temperature indicators. Self-adhesive labels exist which change color at temperatures from 40 to 70 degrees Celsius. Five different temperature responsive patches may be placed on one label.

Like liquid crystals, cupromercuric iodide compositions are limited in their useful temperature range. Further, they are subject to decomposition at higher temperatures, potentially releasing toxic mercury compounds.

A third class of thermochromic materials is made up of rare-earth oxides contained by glass compositions. These materials absorb light in narrow wavelength bands which broaden and change position slightly due to temperature changes. The main disadvantage is that sophisticated spectrophotometry and computer analysis is required to detect the slight changes in wavelength due to temperature variations.

SUMMARY OF THE INVENTION

According to its major aspects this invention is a composition to measure temperature utilizing thermochromic semiconductors. Thermochromic semiconductors have an optical absorption edge which appears within the visible spectrum and moves reproducibly as a function of temperature.

Another object of the invention is to place the thermochromic semiconductor material within a glass matrix to prevent the semiconductor material from leaching or leaking. The glass matrix also seals out air which allows the temperature sensor to detect high temperatures without breaking down the semiconductor material.

Another object of the invention is to provide optical temperature sensors with a range from near absolute zero to around 1000 degrees Celsius.

A further preferred object of the invention is to utilize cuprous oxide or cadmium sulfide as the thermochromic temperature sensor material.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
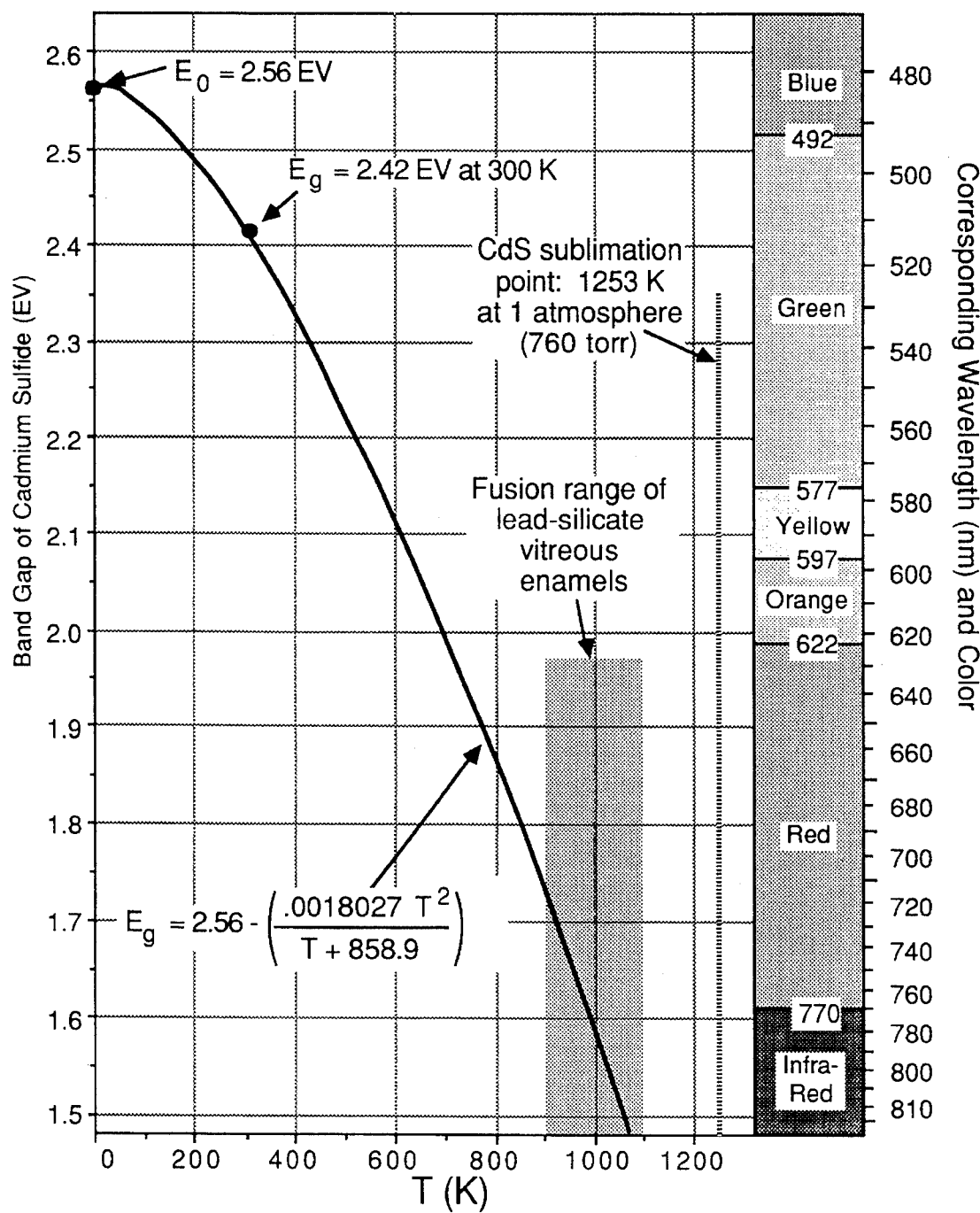
FIG. 1 shows the band gap of cadmium sulfide (EV) in relation to Temperature. The corresponding Wavelength and Spectral Color is also shown.

The preferred embodiment of the invention is thermochromic semiconductor materials in which an optical absorption edge appears preferably within the visible spectrum and moves reproducibly as a function of temperature. This is in contrast with the prior art elements, such as mercuric iodide, which rely upon a phase change.

A short explanation of band theory, a branch of solid-state physics, explains how this invention operates. Electrons can exist in certain energy ranges within a material, but not in others. These are called permitted and forbidden bands, respectively. Electrons flow downhill into lower energy states, but for each band, there is a limit to the number or concentration of electrons which it can hold. As a result, lower bands are filled before higher ones.

Electrons in a filled band are packed in, and cannot move. In an empty band, there are no electrons to move. In a band which is only partly full, however, movement can take place, electricity can flow, and interaction with light may occur. Highly conductive materials are thus those which have partly filled bands.

The highest band in a substance which is mostly filled is called the valence band. The electrons in the highest filled band are responsible for maintaining the binding forces between atoms in the substance. The next higher band, which is mostly empty, is called the conduction band. The separation between these two bands is called the band gap.

A valence electron which is able to absorb enough energy to leap into the conduction band becomes a conduction electron, free to move. The gap which the valence electron leaves behind, called a hole, is also free to move, though usually more slowly. Electrons and holes are collectively known as carriers. The energy to promote the electron from one band to another, creating a carrier pair by in effect breaking a chemical bond within the semiconductor, may come from heat, light, or a number of other sources.

In an insulator the valence band is full and the conduction band is empty. Further, the band gap in an insulator is relatively wide so that normally available sources of energy are not adequate to bridge the gap and no carriers are created. In a metal the opposite is true, the bands touch or even overlap, so that electrons may jump from one band to the other and carriers are plentiful.

A semiconductor lies in between insulators and metals. The semiconductor's bands are separated by a gap which can be bridged with some difficulty by normal thermal or optical energies to generate a relatively small population of carriers.

When light is absorbed by a semiconductor electrons are released into the conduction band. In germanium, for instance, the room temperature band gap energy corresponds to a light wavelength of 1877 nanometers, in the deep infrared. Higher energy photons, including those of visible light, are absorbed, causing germanium to appear dark and opaque, much like graphite. Lower-energy photons are not absorbed, and pass through. In fact, germanium is the material of preference for deep infrared windows and lenses.

There is an abrupt change in absorption only at the bandgap energy which is called an absorption edge. Closely analogous features appear in the X-ray absorption spectra of heavy metals like lead. In lead, the absorption energy is that needed to boost an inner-shell electron into an outer shell. In both cases, the electron requires a fixed, definite amount of energy for transition. Photons with this energy or more energy are absorbed while other photons pass through.

In a semiconductor with a band gap between about 1.6 and 3.1 electron volts, the absorption edge falls within the visible spectrum and may cause the material to be brilliantly colored. The preferred invention uses thermochromic semiconductors in which an optical absorption edge appears within the visible spectrum and moves reproducibly as a function of temperature to provide accurate temperature indications. Two such semiconductor materials are cuprous oxide $Cu_2O$ and cadmium sulfide CdS. Other thermochromic semiconductors include zinc-cadmium sulfoselenides, a family of isostructural compounds represented by the formula $Cd_yZn_{(1-y)}S_bSe_{(1-b)}$ where Cd represents cadmium, Zn represents zinc, S represents sulfur, Se represents selenium and the value of y ranges from 0.5 to 1.0 and the value of b ranges from 0.5 to 1.0.

A broader group of thermochromic semiconductors are defined by the formula $Hg_xCd_yZn_{(1-x-y)}S_bSe_{(1-b)}$ where Hg represents mercury, Cd represents Cadmium, Zn represents zinc, S represents sulfur and Se represents selenium. Further, the value of x ranges from 0.0 to 1.0, the value of y ranges from 0.0 to 1.0 and the value of b ranges from 0.5 to 1.0. This formula defines semiconductors containing mercury which are much different in composition and properties to the mercury iodide which is well known in the prior art.

A still broader group of thermochromic semiconductors is defined by the formula $Zn_xCd_yHg_{(1-x-y)}O_aS_bSe_cTe_{(1-a-b-c)}$ where the value of x is from 0.0 to 0.5, the value of y is from 0.5 to 1.0, the value of a is from 0.0 to 0.5, the value of b is from 0.5 to 1.0 and the value of c is from 0.0 to 0.5. Further, Zn represents zinc, Cd represents cadmium, Hg represents mercury, O represents oxygen, S represents sulfur, Se represents selenium and Te represents tellurium in the above formula.

Only those compositions which are isostructural with pure cadmium sulfide (i.e. with the hexagonal wurtzite structure) are useful herein. The term "isostructural" as used herein refers to a particular arrangement of metal (Zn, Cd, Hg) atoms and nonmetal (O, S, Se, Te) atoms in the crystal lattice, regardless of the actual proportions of elements present. The term wurtzite structure refers to a specific hexagonal lattice arrangement first identified in the zinc ore wurtzite. The term thermochromic cadmium compound as used herein may refer to any of the compositions defined by the preceding formulas, even where no actual cadmium may be present (i.e., y==0).

Further, equimolar amounts of elements taken from column IIB and column VIA of the periodic table combine to form the thermochromic semiconductors mentioned in the above formulas provided the hexagonal wurtzite structure is present.

Cuprous oxide, another thermochromic semiconductor, has an absorption edge near the red end of the spectrum and appears deep blood red. Cadmium sulfide has an absorption edge near the blue-green end of the spectrum and appears as a vivid yellow color slightly tinted with orange. Because of their brilliant colors, both of these compositions have been used as pigments. They are chemically stable and do not fade on exposure to light.

At high temperatures, both cuprous oxide and thermochromic cadmium compounds will undergo air oxidation, losing their colors. If, however, either material is surrounded with a glass matrix, air will be sealed out and the material may be taken to high temperatures without breaking down. Surrounding the semiconductor material with a glass matrix serves a second purpose. The material is prevented from leaching out of the matrix.

The temperature-induced color change of these materials results from a property common to all semiconductors. The permitted energy bands change as a function of temperature, typically broadening as the material grows hotter. As a result, the band gap progressively narrows, so that photons with lower and lower energies may be absorbed and boost electrons into the conduction band. The absorption edge thus moves with temperature, allowing more and more photons to be absorbed.

The band gap of any semiconductor is approximated, at least from absolute zero to well above room temperature, by the Varshni equation: $E_g=E_o-(\alpha T^2/(T+\beta))$ where $E_g$ is the band gap at any Kelvin temperature T, $E_o$ is the band gap at absolute zero, and $\alpha$ and $\beta$ are derived from experimental measurements of the band gap at various temperatures.

The Varshni approximation breaks down as materials approach their melting points, presumably because higher order effects come into play. At a semiconductor's melting point, the band gap would be expected to go to zero since at that point the thermal energy is sufficient to begin breaking the valence bonds. The semiconductor is at the point of becoming a liquid which has no band structure.

Although cadmium sulfide sublimes at 980 degrees Celsius at atmospheric pressure, it can exist as a liquid at pressures in excess of 100 atmospheres, showing a melting point of 1750 degrees Celsius (2023 K.). If the melting-point band gap is assumed to be zero, modified Varshni coefficients can be derived:

$$E_g = 2.56 - (0.0018027T^2/(T+858.9))$$

These coefficients yield the curve shown in FIG. 1 which is in observed temperature induced color changes in cadmium sulfide indicators.

As shown in FIG. 1, at absolute zero cadmium sulfide reflects all red, orange, yellow, green and some blue light and thus appears a rather pale yellow. With increasing temperature, the absorption edge advances first through the blue and then into the green wavelengths, causing those colors' reflectivity to be lost. At room temperature, cadmium sulfide has its characteristic bright yellow hue. As the temperature continues to rise, the absorption edge moves onward, turning the material first orange and then red. Around 1000 degrees Kelvin (about 700 degrees Celsius), the edge passes out of the visible range entirely and cadmium sulfide turns black.

Figure 2:
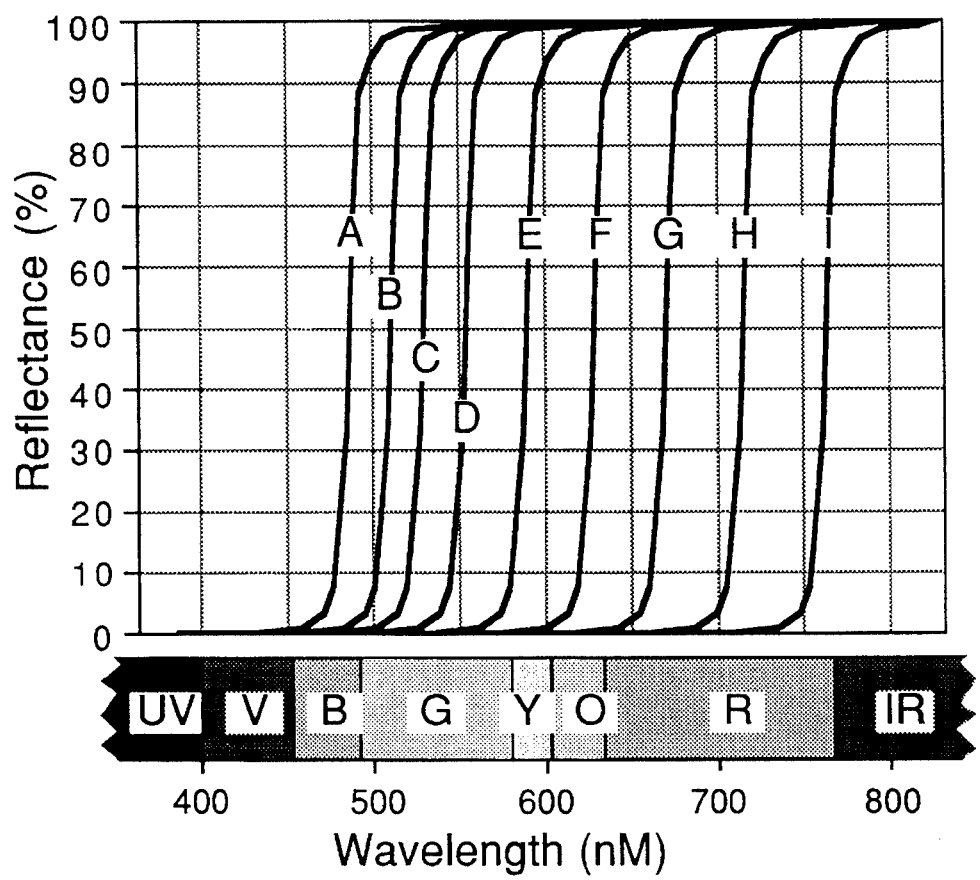
FIG. 2 is a graph showing the reflectance of cadmium sulfide as a function of the wavelength of light and at various temperatures.

When suitably protected cadmium sulfide or another thermochromic semiconductor is placed in an area or in contact with an object whose temperature is to be measured, the spectral reflectance will change as a function of temperature. Reflectance measurement will then reveal the temperature of the sample to almost any desired degree of accuracy. FIG. 2 shows a drawing indicating the reflectance of cadmium sulfide as a function of the wavelength of light as set forth in the table which follows:

| Curve | Temperature(Kelvin) | Wavelength(Nanometers 50%) |
|---|---|---|
| A | 0 | 483 |
| B | 300 | 512 |
| C | 400 | 532 |
| D | 500 | 559 |
| E | 600 | 586 |
| F | 700 | 622 |
| G | 800 | 664 |
| H | 900 | 712 |
| I | 1000 | 780 |

Virtually any thermochromic semiconductor may be used in this invention, but thermochromic cadmium compounds have the advantage of producing a color change in the visible spectrum so that well-established visible light filtering, focusing and alignment methods may be used. Use of another semiconductor material would generally require the use of more expensive infrared or ultraviolet detecting instruments.

The preferred glass matrix for the thermochromic temperature indicator consists of lead-silicate. This type of glass has a refractive index (n) between 1.8 and 2.6, increasing with the proportion of lead. Thermochromic cadmium compounds have refractive indices in the range from 2.4 to 2.8; that of cuprous oxide is 2.85. The use of a properly chosen lead-silicate glass to contain the thermochromic material can thus provide close optical matching, minimizing stray reflections which may obscure the absorption edge. The incorporation of discrete phases of colored metal compounds into glass matrices is well known in the vitreous enamel industry and need not be explained further. Lead silicate glass is the traditional matrix because good optical matching yields brilliant colors.

Figure 3:
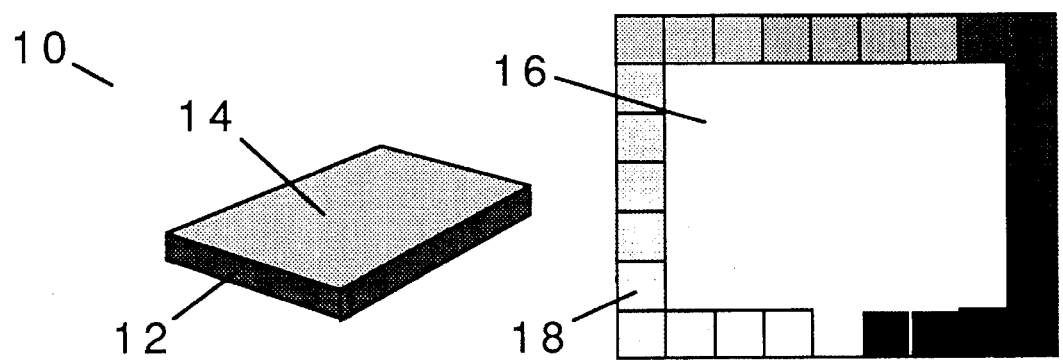
FIG. 3 is a first embodiment of the invention which utilizes a flat chip or carrier. The temperature may be read visually by a user.

FIG. 3 shows a first embodiment 10 of the invention which is a simple flat carrier 12. Carrier 12 comprises a metal such as copper, silver or stainless steel. Alternatively, carrier 12 may be formed by a ceramic material or a high melting glass. One or both sides of the metal are coated with an enamel 14 which includes a thermochromic semiconductor. As yet another alternative, chip 12 may comprise a glass which includes the thermochromic semiconductor. Any number of the temperature sensing chips may be attached to an object whose temperature may vary across the surface. Examples are an aircraft wing, an engine and any other moving or stationary machine part.

Further, as also shown in FIG. 3, a card 16 having a series of printed areas 18 at the edges, each of which duplicate the color of light reflected by the chip at a specific temperature may be used. The temperature of the chip 10 may be estimated by comparing the color with that of the printed area.

Figure 4:
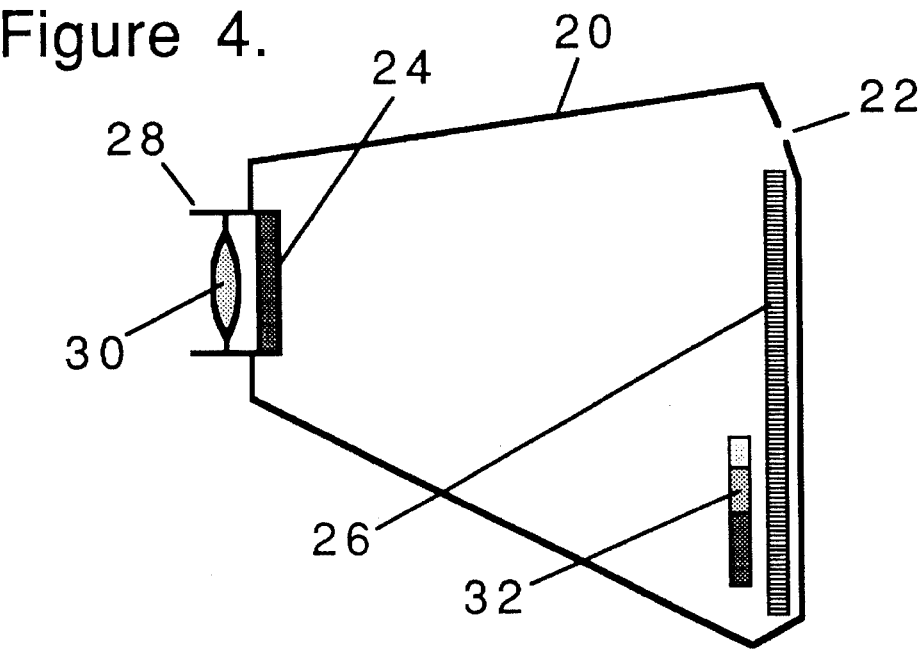
FIG. 4 is another embodiment of the invention which forms a simple spectroscope.

FIG. 4 shows another embodiment of the invention comprising a simple measuring device consisting of a housing 20, a narrow slit 22, a piece of transparent replica diffraction grating 24, a temperature scale 26, and a viewing port 28. An optional focusing lens 30 is also present. The effect of the slit, lens, and grating, when aligned with a chip 10 is to form a spectral image 32 of the chip against the temperature scale. The position of the absorption edge against the scale 26 indicates the temperature.

Figure 5:
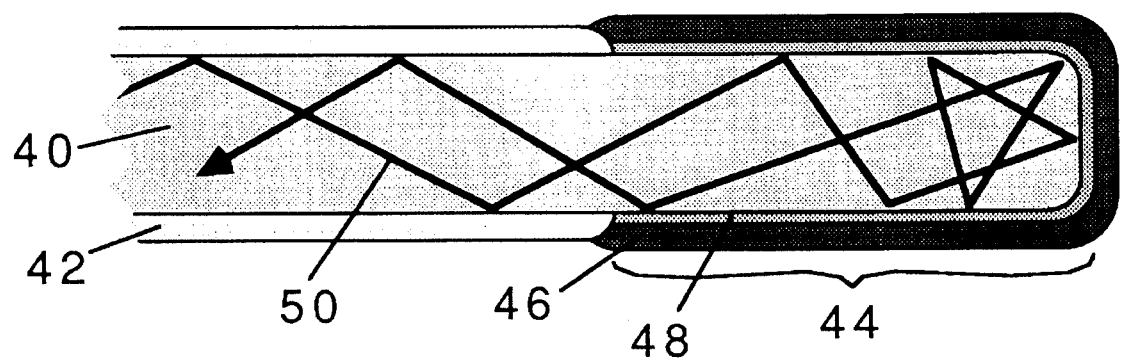
FIG. 5 is another embodiment which utilizes an optical fiber to form a sensor.

This device is particularly adaptable to optical-fiber sensing, since a sensor may be formed simply by placing the end of a fiber into a thermochromic semiconductor composition. As shown in FIG. 5, this embodiment of the invention includes an optical fiber 40, clad with low-refractive index material 42 except at the tip 44. Light is thus confined to the fiber at all regions except at tip 44 which forms the sensor. Fiber 40 is formed of relatively high-melting glass such as silica. The sensor is formed by coating tip 44 with a composition including cadmium sulfide or another thermochromic semiconductor fused into a lead-silicate base. The tip 44 is then heated in a controlled cycle so that the composition fuses to form a continuous layer 46 and then undergoes interdiffusion with the surface layer of the fiber to form a boundary layer 48 of intermediate and usually graded composition. The boundary layer 48 is at least one micron thick. Preferably, the boundary layer 48 is on the order of five to ten microns thick.

A ray of light 50 projected into fiber 40 from a distant source, and consisting of many wavelengths of visible light travels without significant loss confined by material 42. Upon reaching the tip 44, the light is coupled through layer 48 into layer 46. The light interacts with thermochromic semiconductor particles in layer 46. Photons with energies above the absorption edge are absorbed, while those with lower energies are scattered back at random angles through layer 48 and into fiber 40. Because the scattering angle is random for any nonabsorbed photons, such photons will typically undergo many separate, successive interactions and scatterings. As a result, tip 44 acts much like a black body for photons with energies above the absorption edge. The photons are essentially absorbed completely. Photons with lower energies remain unattenuated. This action both sharpens the absorption edge and helps to compensate for any sensor to sensor variations which might be caused by differing tip geometries and sensor compositions.

Further, since cadmium sulfide is volatile, a thin layer vapor deposited on a substrate could be used as the sensing element. The end of the fiber could be fused with a lower melting glass. Depending on the thickness of the evaporated layer, a reflective backing may or may not be needed. Alternatively, a thermochromic cadmium compound of almost any desired composition could be formed by co-depositing the proper combination of the component elements. Zinc, mercury, cadmium, sulfur, selenium and tellurium are all fairly volatile as free elements.

Figure 6:
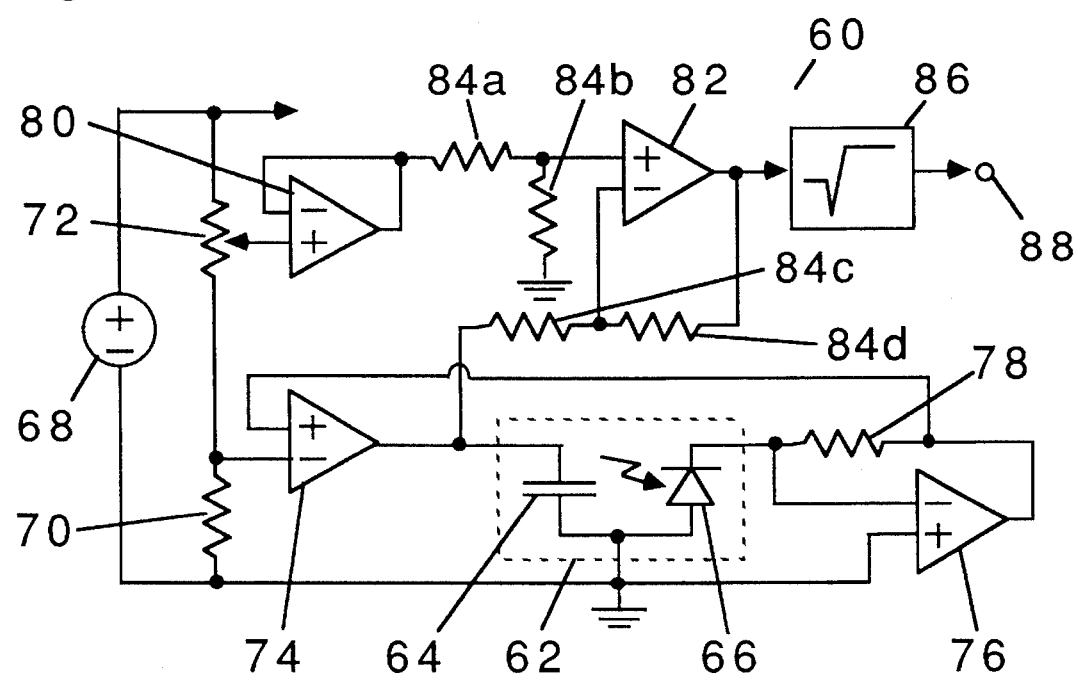
FIG. 6 is a band edge tracking circuit intended for use with the sensors disclosed previously.

FIG. 6 shows an electrical circuit which serves as a simple, compact and inexpensive band-edge tracking spectrophotometer 60. This circuit may be utilized with the sensor shown in FIG. 5 or any other sensor utilizing the invention. This circuit includes an electrically tunable optical bandpass filter and photodetector 62, which consists of a Fabry-Perot bandpass interference filter adjustable by means of a piezoelectric stack 64 and admitting selected light wavelengths to a photovoltaic cell 66.

Stack 64 appears electrically as a capacitive load. With zero voltage applied, the stack holds the Fabry-Perot mirrors (55, 92 in FIG. 7) at maximum spacing, selecting the device's longest center wavelength. With increasing voltage of the correct polarity, the stack moves the mirrors closer together so that successively shorter wavelength bands are selected. With a given spectrum of light incident on cell 66, a current representing the light intensity in each band is generated, flowing through the cell and to ground.

All components are powered by a well regulated, DC power supply 68. Connected across this supply is the series combination of a fixed resistor 70 and a potentiometer 72. An operational amplifier 74 drives stack 64, while a second amplifier 76 is connected with diode 66 via feedback resistor 78 so that its output voltage is proportional to the current generated by light striking the diode. This output voltage is fed back to amplifier 74 and compared with the constant voltage at the junction of resistor 70 and potentiometer 72. Resistor 78 is chosen so that the voltage from amplifier 76 is less than the junction voltage at wavelengths for which light is reflected but higher than the voltage at wavelengths where light is absorbed. The effect is to keep piezoelectric stack 64 poised at the spacing for which cell 66 sees wavelengths at the absorption edge.

The output voltage from amplifier 74 is thus a function of the sensor temperature, though a very nonlinear output. The remaining components are used to convert the output to a linear function. Potentiometer 72 is trimmed to match the amplifier's output voltage with the thermochromic material at absolute zero. Amplifier 80 buffers this voltage, and the combination of amplifier 82 and resistors 84a through 84d, which are all equal, subtracts the actual signal value from the value at absolute zero. Math block 86 then takes the square root of the result, yielding a nearly linear output function at terminal 88. The output of terminal 88 corresponds directly to the temperature being sensed by the optical temperature sensor. The output from terminal 88 may be connected to any well known digital or analog display device to provide an indication of temperature.

Figure 7:
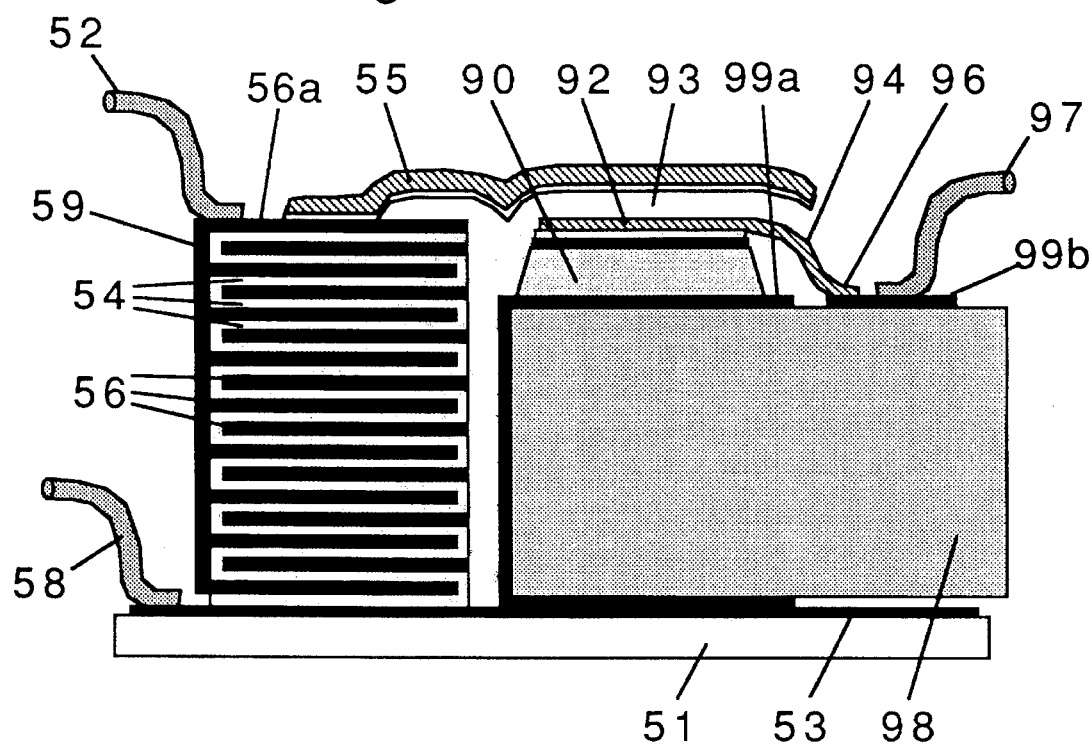
FIG. 7 is a Fabry-Perot optical bandpass filter useful with the circuit shown in FIG. 6 to detect signals which correspond to the absorption edge of the semiconductor material.

FIG. 7 shows one embodiment of the variable-spacing Fabry-Perot interference filter and photodiode whose electrical equivalent was shown as element 62 in FIG. 6. This filter selects any desired narrow band of wavelengths from the visible and near visible spectrum. In this filter the mirrors reflect most of the light, transmitting only a small amount. Because the light undergoes multiple reflections and interferences, wavelength selectivity is very strong. The spectral response depends almost solely on the spacing between the two mirrors. Coupled with a silicon photocell or photodiode as represented by element 66 in FIG. 6, this filter provides tuning over a wide frequency range.

As shown in FIG. 7, the filter device comprises a photovoltaic cell or photodiode 90 having a conductive metallic surface layer 92, which is preferably formed by conventional beam-lead technology optionally modified to use silver in place of the usual platinum and gold, and of a thickness chosen to reflect most incident light away from the diode surface while passing a small proportion of such light into the diode. The proportion of light passed is substantially independent of the wavelength. A beam lead 94, physically an extension of layer 92, extends laterally away from diode 90, unsupported for a distance equal to several times its thickness, ending in a tip 96.

A spacer block 98, of ceramic or other insulating material, has one area of metallization 99a corresponding to the underside of diode 90 on its upper surface and extending down to cover the lower surface as well, and has a second metallized area 99b corresponding to beam lead end 96. Diode 90 and beam lead end 96 are metallurgically bonded to areas 99a and 99b respectively.

A substrate 51 bears a first metallization layer 53, and above this a succession of alternating dielectric layers 54 and metal layers 56. All layers 54, 56 share the same form which is that of a squared off letter U partly surrounding block 98. Layers 54, 56 are equal in number, which is preferably between 50 and 100. The uppermost layer 56a is metal. Alternating metal layers are connected to each of two interconnecting metal buses which are isolated from each other in the same manner as in a conventional ceramic multilayer monolithic capacitor. One bus is connected with substrate metallization layer 53. The other bus 59 is connected with the uppermost metal layer 56a. The dielectric comprising layers 54 is a material such as barium/calcium titanate, which is piezoelectric and capable of being poled by the application of voltage to the buses while the stack is being cooled through its Curie point.

A rigid, partly reflective metal layer 55, preferably formed chiefly from silver, is located close to and parallel with cell surface layer 92, and has the same approximate reflectivity. Therefore, a small percentage of light penetrates the metal layer 55 which is preferably one micron thick. A narrow gap 93 of uniform width, separates thin layer 55 from surface 92. This gap is adjustable in width by the piezoelectric action of layers 54 and thereby forms a Fabry-Perot bandpass filter whose center wavelength is electrically variable without the need for any moving parts. Gap 93 is preferably formed by the removal of a uniformly thick sacrificial layer (not shown) after layer 55 has been formed.

External connectors 97, 58 and 52 make electrical connection with metallized area 99b, substrate metallization layer 53, and metal layer 56a.

The above electrical circuit and variable optical bandpass filter are one of many means by which process signals give an output corresponding to the temperature detected by the thermochromic semiconductor material. Other well known electrical circuits, both digital and analog, may also perform this function.

It will be apparent to those having ordinary skill in the art that many changes and modifications can be made to the foregoing description of the preferred embodiment without departing from the spirit and scope of the invention, as defined by the appended claims.

What is claimed:

1. An optical temperature sensor comprising:

a thermochromic semiconductor material, wherein said thermochromic semiconductor material is defined by the formula $Zn_xCd_yHg_{(1-x-y)}O_aS_bSe_cTe_{(1-a-b-c)}$ wherein Zn represents zinc, Cd represents Cadmium, Hg represents mercury, O represents oxygen, S represents sulfur, Se represents selenium, and Te is tellurium; and the value of x ranges from 0.0 to 0.5, the value of y ranges from 0.5 to 1.0, the value of a ranges from 0.0 to 0.5, the value of b ranges from 0.5 to 1.0 and the value of c ranges from 0.0 to 0.5, said thermochromic semiconductor material being contained within a tip of an optic fiber having a glass matrix containing said thermochromic semiconductor covering the fiber tip and forming a continuous layer; and a boundary layer formed by interdiffusion of said glass matrix with the surface layer of said optic fiber tip; and said boundary layer being inside said continuous layer;

said thermochromic semiconductor material changing color in response to changes in temperature; and said semiconductor material comprising a hexagonal wurtzite structure.

2. The optical temperature sensor of claim 1 wherein said boundary layer has a thickness of at least one micron.

3. The optical temperature sensor of claim 1, whrein said boundary layer has a thickness on the order of five to ten microns.

4. An optical temperature sensor comprising:

a thermochromic semiconductor material, wherein said thermochromic semiconductor material is defined by the formula $Hg_xCd_yZn_{(1-x-y)}S_bSe_{(1-b)}$ where Hg represents mercury, Cd represents Cadmium, Zn represents zinc, S represents sulfur and Se represents selenium; and the value of x ranges from 0.0 to 1.0, the value of y ranges from 0.0 to 1.0 and the value of b ranges from 0.5 to 1.0;

said thermochromic semiconductor material being scaled within a glass matrix to allow for an indication of high temperatures;

said thermochromic semiconductor material changing color in response to changes in temperature;

said sensor further comprising a tip of an optic fiber having said glass matrix containing said thermochromic semiconductor covering the fiber optic tip and forming a continuous layer; and a boundary layer formed by interdiffusion of said glass matrix with the surface layer of said optic fiber tip; and said boundary layer being inside said continuous layer.

5. The optical temperature sensor of claim 4, wherein said glass matrix comprises lead silicate glass.

6. The optical temperature sensor of claim 4, Wherein said sensor further comprises:

signal processing means connected to said optical fiber which provides a temperature signal in response to light projected onto said optic fiber and reflected back to said signal processing means.

7. The optical temperature sensor of claim 6, wherein said signal processing means further comprises:

a band edge tracking spectrophotometer circuit including an electrically tunable optical bandpass filter and a photodetector.

8. The optical temperature sensor of claim 4, wherein said boundary layer has a thickness of at least one micron.

9. An optical temperature sensor comprising:

a thermochromic semiconductor material defined by the formula $Cd_yZn_{(1-y)}S_bSe_{(1-b)}$ where Cd represents Cadmium, Zn represents zinc, S represents sulfur and Se represents selenium; and the value of y ranges from 0.5 to 1.0 and the value of b ranges from 0.5 to 1.0;

said thermochromic semiconductor material comprising a wurtzite structure;

said thermochromic semiconductor material being embedded within a lead silicate glass matrix to allow for an indication at high temperatures;

said temperature sensor changing color in response to changes in temperature;

said sensor further comprising a tip of an optic fiber having said glass matrix containing said thermochromic semiconductor covering the fiber optic tip and forming a continuous layer; and a boundary layer at least one micron thick formed by interdiffusion of said glass matrix with the surface layer of said optic fiber tip;

said boundary layer being within said continuous layer;

and signal processing means including a band edge tracking spectrophotometer circuit, said signal in processing means connected to said optical fiber which provides a temperature signal in response to light projected onto said optic fiber and reflected back to said signal processing means.

10. The optical temperature sensor of claim 9, wherein said thermochromic semiconductor material comprises cadmium sulfide.

\* \* \* \* \*